United States Patent [19]

Pagdin

[11] Patent Number: 4,530,334

[45] Date of Patent: Jul. 23, 1985

[54] AIR FLOW METERING

[75] Inventor: Brian C. Pagdin, Dunstable, England

[73] Assignee: Solex (U.K.) Limited, London, England

[21] Appl. No.: 555,482

[22] Filed: Nov. 28, 1983

[30] Foreign Application Priority Data

Dec. 9, 1982 [GB] United Kingdom ................. 8235118

[51] Int. Cl.[3] ......................... G01F 1/28; F02M 51/00

[52] U.S. Cl. ................................. 123/494; 73/861.76

[58] Field of Search ....................... 123/494, 472, 478; 73/861.74, 861.75, 861.76, 118; 261/44 F, 50 A

[56] References Cited

U.S. PATENT DOCUMENTS

| | | | |
|---|---|---|---|
| 2,765,656 | 10/1956 | Parshall | 73/861.75 |
| 3,972,314 | 8/1976 | Dupont et al. | 123/452 |
| 4,085,723 | 4/1978 | Tanaka et al. | 123/452 |
| 4,197,824 | 4/1980 | Holzbaur | 261/44 A |
| 4,206,735 | 6/1980 | Miles et al. | 123/445 X |
| 4,392,386 | 7/1983 | Knetsch et al. | 123/494 X |

FOREIGN PATENT DOCUMENTS

| | | |
|---|---|---|
| 2547635 | 4/1977 | Fed. Rep. of Germany . |
| 2544791 | 4/1977 | Fed. Rep. of Germany . |
| 2163275 | 7/1973 | France . |
| 451295 | 8/1936 | United Kingdom . |
| 927299 | 5/1963 | United Kingdom . |
| 1525538 | 9/1978 | United Kingdom . |
| 2025521 | 1/1980 | United Kingdom . |

*Primary Examiner*—Tony M. Argenbright
*Attorney, Agent, or Firm*—Parkhurst & Oliff

[57] ABSTRACT

A single point fuel injection air/fuel metering device comprises a tubular housing with a flap pivotally mounted therein upstream of a throttle valve. The flap is dynamically balanced about its pivot axis, which is offset from the axis of the tubular housing and is wholly within the bore of the tubular housing throughout its range of angular movement. A flap return spring which is anchored in the tubular housing upstream of the flap acts at the center of area of the flap. A rotary damper spindle and a rotary potentiometer spindle project coaxially into the housing bore from opposite sides thereof and the flap is clamped to them so that it is supported by the low friction bearings of the damper and the potentiometer. An injector is mounted to inject fuel into the bore between the flap and the throttle valve.

8 Claims, 4 Drawing Figures

AIR FLOW METERING

DESCRIPTION

This invention relates to air flow metering means adapted to measure air flow to an inlet manifold of an internal combustion engine, and to an air/fuel metering device for an internal combustion engine, the device incorporating such air flow metering means.

GB-A-1525538 and DE-A-2554791 disclose air flow metering means adapted to measure air flow to an inlet manifold of an internal combustion engine, comprising a body forming an air flow passage for the air flow to be metered, a flap which is supported for pivotal movement within the passage about an axis which is offset from the longitudinal axis of the passage, the flap being supported by rotary low friction bearings mounted on the body, resilient biassing means which urge the flap into a position in which it extends across and substantially closes the passage and which act on the flap in opposition to the fluid pressure loading on the flap due to air flow through the passage, low friction damping means operable to damp pivotal movement of the flap without substantially increasing the inertia of the moving parts of the air/fuel metering means, and sensing means operatively associated with the flap without loading it significantly and operable to emit an output signal which is a measure of the angular position of the flap within the passage and thus is a measure of air flow through the passage.

Frictional resistance to pivotal movement of the flap is significant, which is undesirable. That is because of loading on the bearings in reaction to aerodynamic loading on the flap that is pivotally mounted about an axis which is outside the air flow passage, in reaction to the action of the resilient biassing means which are outside the air flow passage, and in reaction to the weight of structure of which the flap is part, a substantial portion of that structure being outside the air flow passage. FR-A-2163275 and DE-A-2547635 disclose similar arrangements. GB-A-2025521 shows that resilient means comprising a return spring may be positioned within the air flow passage but the general construction disclosed mitigates against achievement of a light weight low inertia arrangement of moving parts.

An object of this invention is to provide an arrangement of air flow metering means incorporating a pivotally mounted flap which leads to minimal loading on the flap pivot bearings and hence to minimal frictional resistance to pivotal movement of the flap. This object is achieved in accordance with this invention by locating the whole of the flap, which is dynamically balanced, within the path of air flow to be metered throughout its range of pivotal movement within the passage and by arranging the resilient means within the air flow passage so that they act substantially at the centre of area of the flap.

The low friction damping means may be a rotary damper comprising a rotor which is supported in a casing by low friction bearings, the casing being mounted on the body and the rotor being connected to the flap. The sensing means may comprise a rotary potentiometer which has a rotor which is supported in a casing by low friction bearings and which is connected to the flap, the potentiometer casing being mounted on the body. Conveniently the flap is clamped onto an opposed pair of substantially coaxial spindles which project into the passage from opposite sides thereof, one of the spindles being part of the rotor of the rotary damper and the other spindle being part of the rotor of the rotary potentiometer so that the low friction bearings by which the flap is supported are the low friction bearings of the rotary damper and of the rotary potentiometer.

Use of a flap which is of low inertia and which is dynamically balanced leads to it being substantially insensitive to gravitational influences such as jolting, cornering or the traversing of bumps, ruts and so forth. The offset mounting of the flap can be optimised in order to achieve the most favourable relationship between the magnitude of the signal forces acting on the flap and the frictional resistance to angular movement of the flap so that friction has minimal effect upon the output signals of the metering means. The flap may comprise a plate punched from sheet material and shaped accurately to suit the cross sectional form of the passage which may be formed by accurate machining, such as by broaching.

The arrangement of the flap whereby it is clamped to the rotor spindle of the rotary potentiometer and the substantially coaxially opposed spindle of the rotary damper enables the flap to be located precisely without risk of catching, rubbing, scuffing or jamming against the adjacent surface portions of the passage which closely surround the flap. Provision of means for damping pivotal movement of the flap leads to the effects of transient air flow rate change being accommodated. The rotary damper damps rapid oscillations that are proportional to velocity of angular movement of the flap. A convenient form of damper is a viscous damper comprising a rotor including the rotor spindle and moveable vanes mounted on the rotor spindle, the vanes being movable between fixed vanes in a chamber which is filled with a viscous fluid, such as a silicone fluid.

Connection of the resilient biassing means, which may comprise a tension spring which is anchored to the body at a location within the passage which is upstream of the flap when the flap is in its closed position, to the flap substantially at its centre of area, leads to the reaction to the resilient loading on the flap being minimised. Provision may be made for adjusting the loading of the tension spring.

Use of a precisely formed flap mounted in a precisely machined bore forming the air flow passage, together with the use of good bearings afforded by the rotary damper and the rotary potentiometer, enables the flap to be positioned with very small precisely sized peripheral clearance between itself and the surrounding wall of the passage which leads to a readily repeatable air flow metering performance. Some form of gap between the flap and the surrounding passage wall has to be accepted in order to avoid undesirable rubbing or any other form of seal between the flap and the wall which would produce undesirable friction.

A honeycomb air flow staightener may be provided in the passage upstream of the flap in order to minimise turbulence and further facilitate repeatable performance of the device.

According to another aspect of this invention there is provided an air/fuel metering device for an internal combustion engine comprising a body forming an air induction passage, a driver-operable throttle valve in the passage, a flap which is supported for pivotal movement within the passage about an axis which is offset from the longitudinal axis of the passage, the flap being supported by rotary low friction bearings mounted on the body and being dynamically balanced, the whole of the flap being located within the path of air flow through the induction passage throughout its range of pivotal movement within the passage, resilient biassing means which act substantially at the centre of area of the flap whereby to urge the flap into a position in which it extends across and substantially closes the passage upstream of the throttle valve and which act on the flap in opposition to the fluid pressure loading on the flap due to air flow through the passage, low friction damping means operable to damp pivotal movement of the flap without substantially increasing the inertia of the flap and associated moving parts, and sensing means operatively associated with the flap which are operable to emit an output which is a measure of the angular position of the flap within the passage and thus is a measure of air flow through the passage, and a fuel injector operable to inject metered quantities of fuel into the passage between the flap and the throttle valve.

The damping means enable the flap to cope with pulsations in the air flow which may occur when the throttle valve is wide open.

The injector may be orientated so that the axis of the path of fuel it injects into the passage is oblique to the longitudinal axis of the passage and passes through the throttle valve at least when the throttle valve is positioned for engine idling. The fuel injector may be a ball valve injector formed substantially as described and claimed in EPA-A-0063952.

One embodiment of this invention will be described now by way of example with reference to the accompanying drawings, of which:

Figure 1:
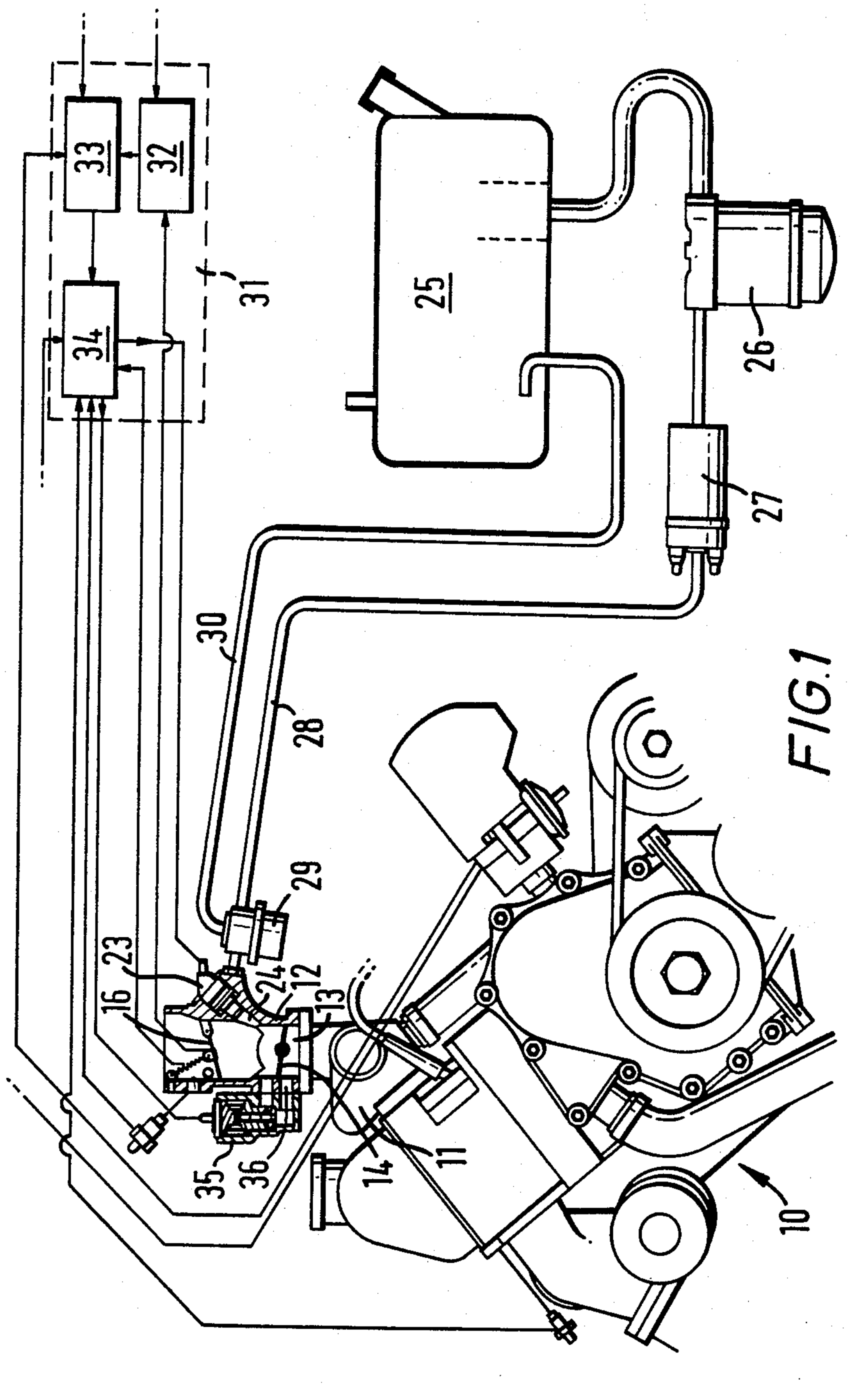
FIG. 1 is a schematic diagram of an internal combustion engine and an associated air/fuel induction system in which this invention is embodied.

The engine 10 shown in FIG. 1 is a multicylinder spark ignition internal combustion engine having the usual inlet manifold 11.

The single point fuel injection air/fuel metering device comprises a tubular housing 12 which forms an air induction passage 13 leading to the inlet manifold 11. There is a butterfly type throttle valve 14 in the passage 13. It is nearer one end, viz. the downstream end of the passage 13 than the other or upstream end. The usual linkage extending from a driver operable pedal (not shown) enables the attitude of the throttle valve 14 within the air passage 13 to be set by the driver.

Figure 2:
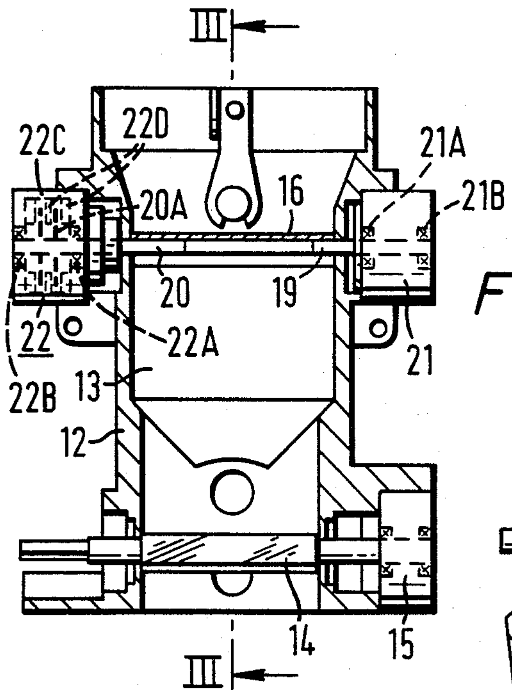
FIG. 2 is a cross section through a single point fuel injection air/fuel metering device shown in FIG. 1, drawn to a larger scale.

FIG. 2 shows that a rotary potentiometer 15, which may be a "hybrid track rotary potentiometer type D15160" such as is marketed by Penny and Giles Potentiometers Limited, has its rotor fitted to an end portion of the throttle valve spindle outside the housing 12. The potentiometer 15 is adapted to emit an output which is a function (T) of the setting within the passage 13 of the throttle valve 14.

The upstream end of the passage 13 is connected to the usual air cleaner (not shown). An air valve flap 16 is mounted for pivotal movement within the passage 13 about an axis 17 which is offset from the longitudinal axis of the passage 13. The flap 16 is arranged such that air flow through the passage 13 tends to urge it in the opening direction against the action of a return spring 18 which is a tension spring anchored at one end to the body 12 within the passage 13 upstream of the flap 16 and at the other end of the flap 16 substantially at the centre of area of the flap 16.

The flap 16 comprises a plate formed from aluminium. The plate is formed by punching from sheet aluminium and shaping accurately to suit the form of the bore portion of the passage 13 within which it is located. The minor portion of the flap 16 that comprises the smaller portion between the axis 17 and the surface portion of the wall that is nearer the axis 17 is formed substantially thicker than the remaining major portion that extends from the axis 17 to the opposite surface portion of the passage 13 so that the flap 16 is dynamically balanced about its axis of rotation 17. The flap 16 is clamped, e.g. by screwing, to an opposed pair of spindles 19 and 20 which project into the passage 13 substantially coaxially from opposite sides thereof.

The spindle 19 is the rotor spindle of another rotary potentiometer 21, which conveniently is similar to the rotary potentiometer 15, and which is mounted outside the housing 12. The other spindle 20 is a rotor spindle of a rotary viscous damper 22. Bearings 21A and 21B of the rotary potentiometer 21 and bearings 22A and 22B of the opposed viscous damper 22, which are ball races by which the rotors are supported within the respective casings, serve as low friction bearings for the flap 16. The damper 22 is of the type which comprises a dashpot 22C filled with silicon fluid and containing fixed vanes 22D between which pass a group of movable vanes 20A which are fixed to the rotor spindle 20 so that they rotate with angular movement of the flap 16. Hence angular movement of the flap 16 about its axis 17 is damped by operation of the damper 22.

Figure 3:
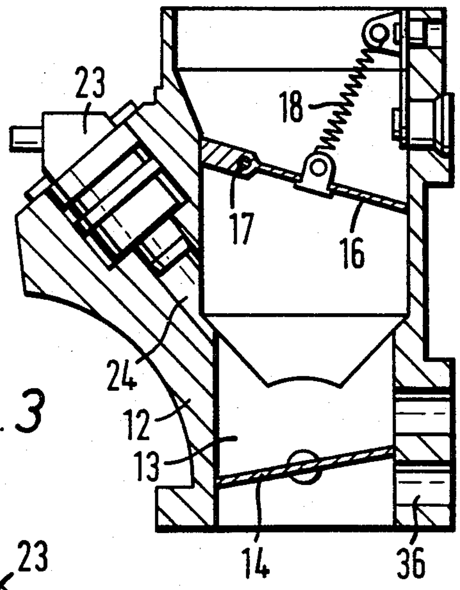
FIG. 3 is a section on the line III—III in FIG. 2.

A solenoid ball valve injector 23 which is constructed substantially as described and claimed in EP-A-0063952 is mounted in an oblique passage 24 which extends through the wall of the body 12 and opens into the passage 13 between the flap 16 and the driver operable throttle valve 14. The passage 24, and hence the longitudinal axis of the solenoid operable ball valve 23, is orientated so that that longitudinal axis passes through the driver operable throttle valve 14 when it is in its position for engine idling, as shown in FIG. 3.

The injector device 23 is connected in a fuel supply system which is illustrated in FIG. 1. The fuel supply system includes the usual tank 25, a filter 26, an electrically operable fuel pump 27 which is located near to or within the fuel tank 25 and which is operable to draw fuel from the fuel tank 25 through the filter 26, a fuel pipe 28 by which fuel is pumped by the pump 27 via a pressure regulator 29 to the fuel injector device 23 and another pipe 30 by which fuel is returned to the fuel tank 25. As is usual practice, the pressure regulator 28 is located adjacent to the fuel injector 23 so that a substantially constant fuel pressure supply to the injector 23 can be provided and a substantially constant pressure drop cross the injector 23 is maintained.

Various other transducers sensing various operating conditions of the engine are provided. These transducers, and the rotary potentiometers 15 and 21, transmit signals to a central electronic control unit 31 which is located in a suitable cool zone such as the passenger compartment of the vehicle. The control unit processes the signals received from the transducers and emits a solenoid drive signal of controlled pulse width and frequency to the solenoid operable fuel injector 23 to effect operation of the injector 23 to inject metered quantities of fuel into the passage 13.

Being more specific, the output signal from the potentiometer 21, which is indicative of air flow through the passage 13, and a signal indicative of engine speed are fed each to a respective input terminal of a basic pulse width memory device 32 incorporated in the unit 31. The memory device 32 is a microprocessor electronic device which comprises a compact digital store of optimum fuelling data for all engine running conditions in the form of a matrix memory store of injector pulse widths tailored to match the engine requirements and is adapted, based on the two input parameters indicative of air flow and engine speed, to emit an output which is a basic injector pulse width which is a function of the fuelling data stored for the engine running condition to which those two parameters apply.

The basic injector pulse width output signal emitted by the memory device 32 is modified by an output from an air pressure sensor and an output from an air temperature sensor which respectively sense the pressure and temperature conditions prevailing in the passage 13 between the flap 16 and the throttle valve 14, by an output from an engine cooling water temperature sensor and by the output (T) from the throttle setting sensing rotary potentiometer 15 which is an indication of the incidence of transient conditions and is used as a basis for transient enrichment, each in turn in respective microprocessor circuits (not shown). The resultant output and an output which is indicative of the instantaneous engine cycle condition are fed to respective inputs of a distribution cycle counter device which has an output for each cylinder of the engine 10. The modified basic pulse width output received by the distribution cycle device is emitted from the output of that device corresponding to the cylinder that, in accordance with the engine cycle condition input signal received, is the cylinder to which the respective pulse of fuel to be injected by the injector 23 will be directed. Each of the outputs of the distribution cycle counter device is fed to a corresponding input of a distribution memory device 33 whereby a final correction of the basic pulse width signal appropriate for the respective cylinder is effected. The correction effected in the distribution memory device 33 modifies the basic pulse width signal in accordance with the peculiar operational characteristics of the respective cylinder in accordance with data stored by the distribution memory device 33.

The device 33 has a single output which is fed to an amplifier and injector drive circuit 34 which is associated with the injector device 23 and which activates the injector device 23 to inject fuel for the duration of the pulse. Hence the final pulse width signal determines both the commencement of each continuous fuel injection and the duration of that continuous injection. Injection of fuel is synchronised with ignition in the respective cylinder.

It follows that the pulse width signal that governs the continuous injection of fuel that makes up a charge of air and fuel for each cylinder is tailored to suit the respective cylinder and may be different for each cylinder.

Fuel is injected at a rate proportional to engine speed and ideally at a rate of one injection for each cylinder air charge.

FIG. 1 shows that the injector drive circuit 34 has a second output, viz. an idle speed control signal output. The metering device 12 is provided with an idle speed control device 35 which communicates with the induction passage 13 through an aperture 36 which is downstream of the throttle valve 14.

Figure 4:
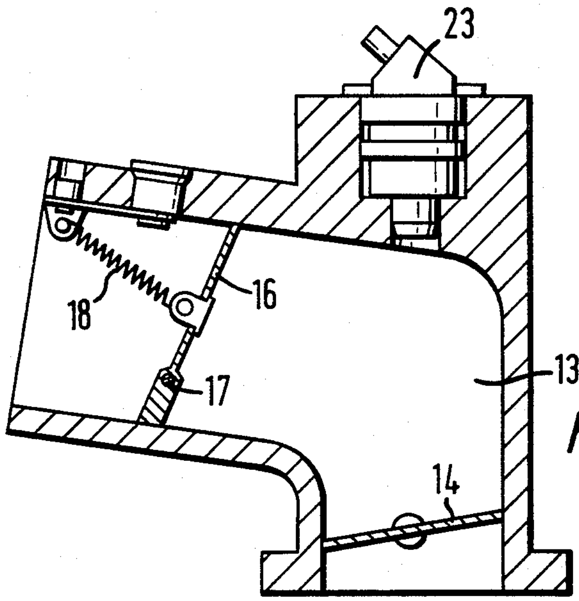
FIG. 4 is a view similar to FIG. 3 of another form of single point fuel injection air/fuel metering device for use in the air/fuel induction system shown in FIG. 1.

FIG. 4 shows that there may be a bend in the passage 13 between the flap 16 and the throttle valve 14, the injector 23 being mounted to inject fuel into the area of the bend substantially coaxially with the part of the passage 13 in which the throttle valve 14 is located.

I claim:

1. Air flow metering means adapted to measure air flow to an inlet manifold of an internal combustion engine, comprising a body forming an air flow passage for the air flow to be metered, a flap which is supported for pivotal movement within the passage about an axis a central portion of which is offset from both the longitudinal axis and the walls of the passage, the flap being supported by rotary low friction bearings mounted on the body and being dynamically balanced, the whole of the flap being located within the path of the air flow to be metered throughout its range of pivotal movement within the passage, resilient biassing means which act substantially at the centre of area of the flap whereby to urge the flap into a position in which it extends across and substantially closes the passage and which act on the flap in opposition to the fluid pressure loading on the flap due to air flow through the passage, low friction damping means operable to damp pivotal movement of the flap without substantially increasing the inertia of the moving parts of the air flow metering means, and sensing means operatively associated with the flap without loading it significantly and operable to emit an output signal which is a measure of the angular position of the flap within the passage and thus is a measure of air flow through the passage.

2. Air flow metering means according to claim 1, wherein said rotary low friction bearings are mounted in the body on opposite sides of the passage.

3. Air flow metering means according to claim 1, wherein the low friction damping means comprise a rotary damper including a rotor supported within a casing by low friction bearings, the casing being mounted on the body and the rotor being connected to the flap.

4. Air flow metering means according to claim 3, wherein the rotary damper is a viscous damper, the rotor comprising vanes which are movable between fixed vanes in a dashpot chamber which is formed in the casing and which is filled with a viscous fluid.

5. Air flow metering means according to claim 1, wherein the sensing means comprise a rotary potentiometer which has a rotor which is supported in a casing by low friction bearings and which is connected to the flap, the potentiometer casing being mounted on the body.

6. Air flow metering means according to claim 5, wherein the low friction damping means comprise a rotary damper including a rotor supported within a casing by low friction bearings, the damper casing being mounted on the body on the opposite side of the passage from the potentiometer casing and the rotor being connected to the flap, the flap being clamped onto an opposed pair of substantial-coaxial spindles which project into the passage from opposite sides thereof, one of the spindles being part of the rotor of the rotary damper and the other spindle being part of the rotor of the rotary potentiometer so that the low friction bearings by which the flap is supported are the low friction bearings of the rotary damper and of the rotary potentiometer.

7. Air flow metering means according to claim 1, wherein the resilient biassing means comprise a tension spring which is anchored to the body at a location within the passage which is upstream of the flap when the flap is in its closed position.

8. A single point fuel injection air/fuel metering device for an internal combustion engine comprising a body forming an air induction passage, a driver-operable throttle valve in the passage, a flap which is supported for pivotal movement within the passage about an axis a central portion of which is offset from both the longitudinal axis and the walls of the passage, the flap being supported by rotary low friction bearings mounted on the body and being dynamically balanced, the whole of the flap being located within the path of air flow through the induction passage throughout its range of pivotal movement within the passage, resilient biassing means which act substantially at the centre of area of the flap whereby to urge the flap into a position in which it extends across and substantially closes the passage upstream of the throttle valve and which act on the flap in opposition to the fluid pressure loading on the flap due to air flow through the passage, low friction damping means operable to damp pivotal movement of the flap without substantially increasing the inertia of the flap and associated moving parts, and sensing means operatively associated with the flap which are operable to emit an output which is a measure of the angular position of the flap within the passage and thus is a measure of air flow through the passage, and a fuel injector operable to inject metered quantities of fuel into the passage between the flap and the throttle valve.

* * * * *